United States Patent [19]

Thomas

[11] Patent Number: 4,819,535

[45] Date of Patent: Apr. 11, 1989

[54] GLASS CUTTING APPARATUS

[76] Inventor: Carroll M. Thomas, P.O. Box 7418, Boulder, Colo. 80306

[21] Appl. No.: 100,978

[22] Filed: Sep. 25, 1987

[51] Int. Cl.4 .......................................... C03B 33/12
[52] U.S. Cl. ................................. 83/880; 30/164.95
[58] Field of Search ..................... 83/880; 30/164.95; 81/177.6

[56] References Cited

U.S. PATENT DOCUMENTS

| | | | |
|---|---|---|---|
| 1,547,451 | 7/1925 | Scott | 30/164.95 |
| 2,516,668 | 7/1950 | Barrett | 30/164.95 |
| 2,775,276 | 12/1956 | Rossner | 81/177.1 |
| 2,849,041 | 8/1958 | Vetri | 81/177.1 |
| 4,215,472 | 8/1980 | Raven | 30/164.95 |
| 4,283,852 | 8/1981 | Hooper | 30/164.95 |

Primary Examiner—Donald R. Schran
Attorney, Agent, or Firm—Donald W. Margolis

[57] ABSTRACT

A glass cutting apparatus is provided which has a handle portion which allows it to be pushed along the surface of the to-be-cut glass without unnatural or stressful rotation of the wrist and while still maintaining the cutting element portion substantially straight or perpendicular with respect to the to-be-cut glass. The glass cutting apparatus includes an elongated body portion having a glass scoring element secured to one end, and a handle member located at the end of the body portion which is opposed to the glass scoring element end. The handle member includes a portion which extends at an angle to the axial center line of the body portion, as projected, which extended portion is shaped to fit comfortably in the user's hand at the crotch formed between the thumb and the forefinger, while the tips of the user's thumb and forefinger hold the body portion and guide the glass cutting element. This allows the hand which holds the glass cutting apparatus of the present invention to be held in a comfortable position without unnatural or stressful bending or twisting of the user's hand or wrist, while the glass cutting apparatus is pushed in front of the hand.

22 Claims, 1 Drawing Sheet

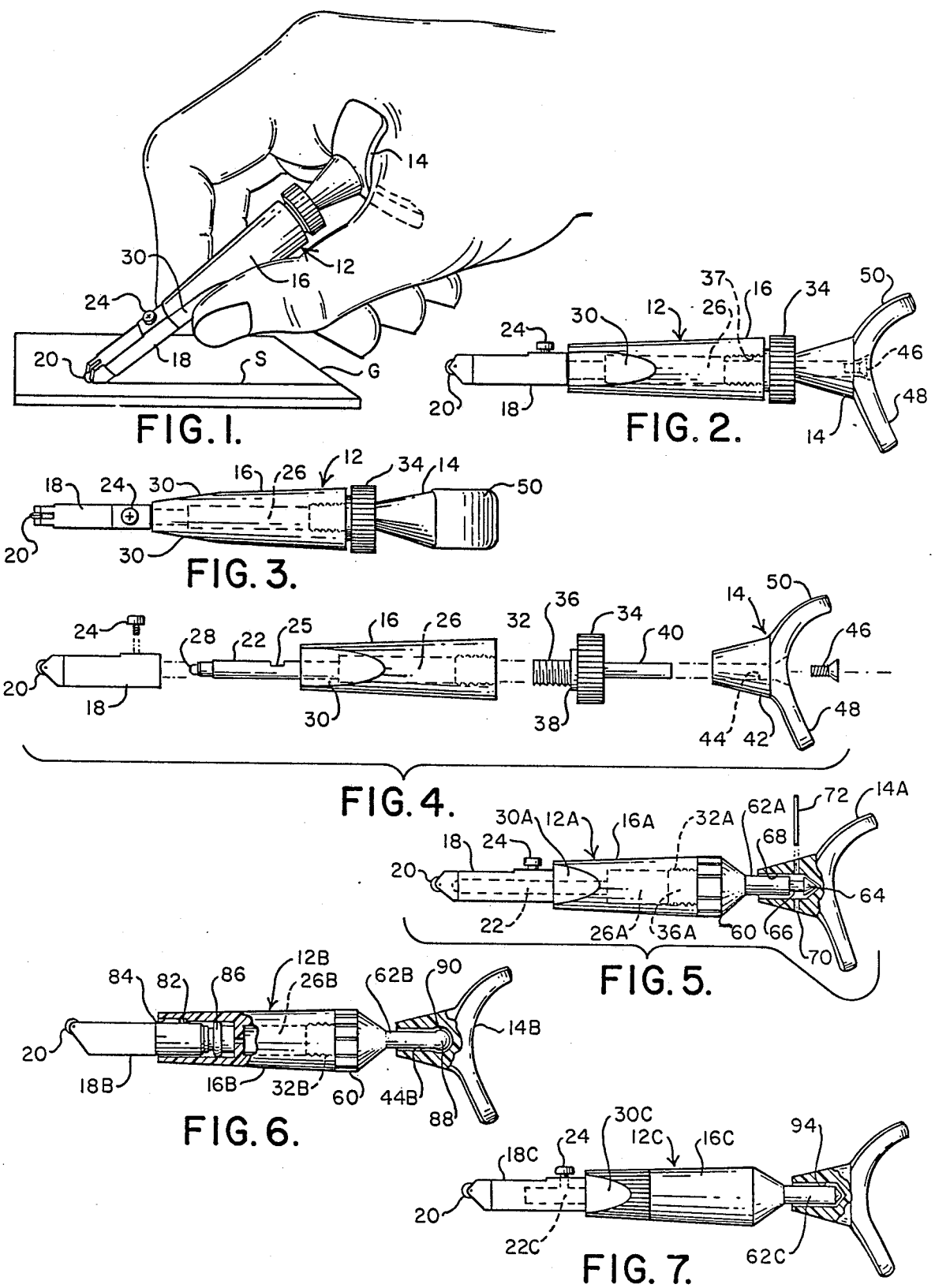

GLASS CUTTING APPARATUS

BACKGROUND OF THE INVENTION (a) Field of the Invention

The present invention relates to glass cutting tools for scoring to-be-cut glass. More particularly it relates to that type of glass cutting apparatus which is held in the hand of a user and passed across a to-be-cut sheet or plate of glass to form a scoreline at which the glass is to be broken.

(b) Discussion of the Prior Art

Tools which are passed across a to-be-cut sheet or plate of glass to form a scoreline at which the glass is to be broken are usually referred to as "glass cutters" or "glass cutting apparatus." Hand held glass cutters are ordinarily comprised of an elongated body portion, which is held in the palm of the hand and guided by the thumb and forefinger, a glass scoring element which is secured to one end of the handle. The glass scoring element most often includes a cutting element which may be in the form of either a rotatable element, such as a steel wheel, or a hard element, such as a diamond. In the use of such a device to score a glass sheet which is to be broken to a predetermined size or shape, the glass scoring element portion of the glass cutting apparatus is usually held firmly against the to-be-cut glass and drawn towards the user. In order to effect accurate cutting of glass with such a type of cutter, it is essential that the glass cutting apparatus not only be maintained in firm engagement with the glass during the entire cutting operation, but also that the glass scoring element be held substantially perpendicular with respect to the glass sheet. This requires that the user maintain a firm, to strong, grip, on the glass cutting apparatus and hold his or her wrist in a rotated position in order to maintain the substantially perpendicular relationship between the glass scoring element and the glass. It also requires that the glass cutting apparatus be drawn or pulled along the surface of the glass toward the user, which in turn, requires that the user's hand and wrist be turned inwardly, in an unnatural position, putting stress upon the hand and wrist. If this is not done, using current glass cutters, the glass may not be scored accurately, and, after being broken may require grinding, if too large, or non-use or destruction if too small.

SUMMARY OF THE INVENTION

It is therefore the aim and principal object of the present invention to provide a hand held glass cutting apparatus having novel handle means which allows the user to hold and easily push the cutter across the to-be-cut glass to form a scoreline.

Another important object of the present invention is the provision of a hand held glass cutting apparatus of the above character which is provided with a handle portion which allows it to be pushed along the surface of the glass without unnatural or stressful rotation of the wrist or hand, while still maintaining the cutting element portion substantially straight or perpendicular with respect to the to-be-cut glass sheet at all times.

More particularly, a hand held glass cutting apparatus is provided which has a handle portion which allows the apparatus to be used to score glass by pushing, rather than by drawing the apparatus across a piece of to-be-cut glass. The glass cutting apparatus of the present invention consists, in general, of an elongated body portion having glass cutting element secured to one end as an extension of the body portion, much as is in the current state of the art. However, in addition, the glass cutting apparatus of the present apparatus includes a handle which is located at the end of the body portion which is opposed to the glass cutting element end. The handle includes a portion which extends at an angle to the axial center line of the body portion. The extended portion of the handle is shaped to fit comfortably in the user's hand at the crotch formed between the thumb and the forefinger and with the tips of the same thumb and forefinger guiding the cutting element. This allows the hand which holds the glass cutting apparatus of the present invention to be held in a comfortable position with the hand in a substantially flat, palm down configuration, instead of requiring twisting of the wrist and hand as is required when a prior art glass cutter is pulled across the glass. With the hand in this orientation it is pushed forward across the glass, and the cutting apparatus is easily pushed in front of the hand.

For a fuller understanding of the nature and objects of the present invention, reference should be made to the following detailed description taken in conjunction with the accompanying drawings.

BRIEF DESCRIPTION OF THE DRAWINGS

The accompanying drawings which are incorporated herein and form a part of the specification, illustrate complete preferred embodiments of the present invention according to the best modes presently conceived for the practical application of the principles thereof, and, together with the specification and claims serve to explain the principles of the invention. In the drawings:

FIG. 1 is an isometric view showing one embodiment of the present invention, partially in phantom, held in the hand of a user and being pushed to score a piece of glass;

FIG. 2 is a side view, partially in phantom, of the glass cutting apparatus shown in FIG. 1;

FIG. 3 is a top elevated view of the apparatus of FIG. 2, also partially in phantom;

FIG. 4 is an exploded view, also partially in phantom, of the glass cutting apparatus shown in FIGS. 1-3;

FIG. 5 is a side plan view, partially in phantom and partially exploded, of another embodiment of the present invention;

FIG. 6 is a side plan view, partially fragmentary and partially in phantom, showing yet another embodiment of the present invention; and FIG. 7 is a side plan view, partially fragmentary and partially in phantom, showing yet another embodiment of the present invention.

Now referring to the drawings, as shown in FIGS. 1-4, one preferred embodiment of the glass cutting apparatus, generally 12 of the present invention is shown, being pushed across a sheet of glass G. It will be noted that a scoreline S is shown on glass sheet G, the scoreline extended from the edge of the sheet of glass G to the location of moving glass cutting apparatus 12, thereby indicating that the glass cutting apparatus is being pushed away from the user.

The glass cutting apparatus 12 of the present invention includes three major components; a handle portion 14, a body portion 16, and a cutting head 18. It should be noted, that the front end of body portion 16 is held and guided by the user's thumb and forefinger of the user, with the extended portion of handle portion 14 fit comfortably into the hand, adjacent the palm, in the crotch formed between the thumb and forefinger. This shape and placement of handle portion 14 allows the cutting apparatus to be easily pushed across the glass. This pushing capability also allows the hand to be held in a comfortable, flat, substantially palm down configuration, instead of requiring twisting of the wrist as is required when a prior art glass cutter is pulled across the glass in order to maintain the cutting implement in a vertical position.

Now referring to FIGS. 2-4, additional details of cutting apparatus 12 are set forth in complete detail. It is seen that cutting head 18 terminates in a cutting implement, in this case rotatably mounted cutting wheel 20. The body of cutting head 18 is hollow to receive and connect with axle 22 which is integral with and carried by body portion 16. When axle 22 is inserted into the hollow of cutting head 18, these elements are then secured together, for example, by means of set screw 24 which engages slot 25 on axle 22.

Body portion 16 is also hollow and includes a reservoir 26 which is intended to carry a light lubricating oil, not shown, which oil is fed to cutting wheel 20 by means of wick 28 which extends through hollow axle 22 and into contact with the inner edge of cutting wheel 20. The front end of body portion 16 which is adjacent to cutting head 18 carries a pair of opposed substantially flat surfaces 30 which are tapered toward cutting wheel 20 and at substantially right angles to a plane to which cutting wheel 30 would be at right angles. Flats 30 provide excellent surfaces for being gripped by the thumb and forefinger of the user to control the pressure and direction of cutting head 18 and cutting wheel 20 while pushing or pulling cutting apparatus 12, and without requiring any substantial bending or twisting of the user's hand or wrist.

The end of body portion 16 which is opposed to axle 22 defines a threaded annular opening 32. Threaded annular opening 32 provides an entrance through which oil can be placed into reservoir 26. Attached to the back end of body portion 16 is knurled connecting nut 34. Extending from knurled connecting nut 34 on one side is threaded shaft 36 which is flat on one side, but which is otherwise sized and designed to enter into and connect with threaded annular opening 32 of body portion 16. When threaded shaft 36 is secured tightly into threaded annular opening 32 it closes reservoir 26, except for vent 37 which is formed between the flat side of threaded shaft 36 and threaded opening 32 of body portion 16. Vent 37 allows air to enter reservoir 26 as oil is depleted. Gasket 38 which surrounds shaft 36 assists in sealing the tip of reservoir 26 and vent 37 against oil leakage.

Extending away from knurled connecting nut 34 on the side opposite to threaded shaft 36 is hollow shaft 40. Shaft 40 is smooth and substantially cylindrical on its outer surface, but carries internal threads in its internal hollow portion. Shaft 40 extends along the axial center line of body portion 16. In this embodiment, handle portion 14 includes a base 42 which defines a cylindrical annular through hole 44. Cylindrical, annular through hole 44 is sized and designed to pivotally receive hollow, internally threaded cylindrical shaft 40. Handle member 14 is in turn mechanically secured to shaft 40 by means of separate screw 46 which connects with the threaded hollow interior of shaft 40 without limiting the pivoting action of handle 14 around shaft 40.

Handle member 14 also includes an extended crosspiece composed of a first wing 48 and an second wing 50. The first wing 48 and second wing 50 are located and oriented in substantial radial opposition to one another on opposite sides of the axial center line of body portion 16, projected beyond its back end. As clearly shown in FIGS. 1-4, and especially in FIGS. 1 and 3, first and second wings 48 and 50 are both of substantially uniform width and substantially rectangular in cross section, with the portion which is to rest in the crotch of the hand between the thumb and forefinger being substantially flat to provide a comfortable fit with that portion of the user's hand. In this embodiment, the first and second wings 48 and 50 together define a saddle or a bow which is designed and shaped to fit comfortably in the hand of a user in the crotch formed between the thumb and forefinger so that glass cutting apparatus 12 may be pushed by a user.

With the foregoing details and structure in mind, it will be seen that in this embodiment the size and shape of cutting apparatus 12, including handle member 14 allows a user to grasp apparatus 12 with his or her thumb and forefingers on flats 30 while resting the extended portion of handle member 14 in the crotch of the hand formed between the thumb and forefinger, and push cutting wheel 20 against a piece of to-be-cut glass G to form a scoreline S. This action does not require the user to apply any substantial amount of pressure to the glass in order to score it, nor does it require that the hand or wrist of the user be twisted into any unnatural or uncomfortable position in order to maintain cutting wheel 20 in a vertical position with respect to glass G. If desired, the glass cutting apparatus 12 of the present invention will also permit the user to draw it toward himself or herself, as is the practice with conventional glass cutting apparatus, but again without any substantial twisting of the hand or wrist.

Modifications

In the following modifications like numbers represent like parts, except that like numbers modified by letters represent parts which have been modified.

Now, referring to FIG. 5, one modification of the present invention is shown. In the modified glass cutting apparatus of FIG. 5, a cutting head 18, similar to that of FIGS. 1-4, is used with a slightly modified body portion 16A. In this embodiment, body portion 16A has shortened flat surfaces 30A, a shorter reservoir 26A having a larger diameter, and a threaded annular opening 32A having a larger diameter to which a knurled cap 60 is secured by means of integral threaded shaft 36A. Extending from knurled cap 60 on the side opposed to integral threaded shaft 36A is a truncated cone terminating in a cylindrical shaft 62A. Shaft 62A terminates in a pointed cap 64 which is connected to shaft 62A by means of circumferential slot 66. In this embodiment, handle member 14A is modified so that it includes hollow cylindrical pocket 68 which is designed and shaped to receive cylindrical shaft 62A and pointed cap 64. Defined within handle member 14A is opening 70, which is oriented substantially perpendicular to and extended through hollow cylindrical pocket 68 in the area adjacent to circumferential slot 66. Pin 72 is placed in opening 70 in a manner to intersect with circumferential slot 66 so that it is trapped in slot 66 between shaft 62A and cap 64. This serves to secure handle member 14A to shaft 62A, while maintaining the ability of handle member 14A to rotate completely around shaft 62A. As with glass cutting apparatus 12, handle member 14A of glass cutting apparatus 12A allows a user to grasp the apparatus with his or her thumb and forefingers on flats 30A while resting handle member 14A in the crotch of the hand formed between the thumb and forefinger, and push cutting wheel 20 against a piece of to-be-cut glass, and without requiring any substantial or uncomfortable twisting of the hand or wrist.

Now, referring to FIG. 6, yet another modification of the present invention is provided. In this modification, glass cutting apparatus 12B includes cutting head 18B. Cutting head 18B includes guide pin 82 which is designed and sized to slide along slot 84 in body portion 16B to orient and to secure cutting head 18B against rotation. Instead of being mounted on an axle, a portion of cutting head 18B is inserted into the open front end of body portion 16B in the orientation dictated by the interaction of pin 82 with slot 84. Cutting head 18B is secured within the front end opening of body portion 14B and also protected against leakage of oil from reservoir 26B by means of O-ring 86 which is carried by cutting head 18B.

In this embodiment body portion 16B does not include any flats. Threaded annular opening 32B of body portion 16B has a knurled cap 60 threadedly secured to it, similar to that described with regard to FIG. 5. However, in this embodiment, knurled cap 60 carries a cylindrical shaft 62B which terminates in a spherical ball 88. Handle member 14B is modified in that it carries and defines an annular cylindrical opening 44B which terminates in a spherical socket 90 which is sized and designed to receive and secure, by pressure fit, spherical ball 88 carried by shaft 62B. This arrangement for connecting handle 14B to body portion 16B allows total rotation of handle member 14B around shaft 62B. As with glass cutting apparatus 12 and 12A handle member 14B of glass cutting apparatus 12B allows a user to grasp the apparatus with his or her thumb and forefingers while resting the extended portions of handle member 14B in the crotch formed in the hand between the thumb and forefinger, and push cutting wheel 20 against a piece of to-be-cut glass, without requiring any substantial twisting of the hand or wrist.

Now referring to FIG. 7, yet another modification of the present invention is shown. In this modification, glass cutting apparatus 12C includes body portion 16C. Body portion 16C is solid, and contains no reservoir of oil. Body portion 16C carries a shortened axle 22C to which cutting head 18C is connected by means of screw 24. The surface of body portion 16C surrounding shortened flat surfaces 30C is grooved to further improve the user's grip of this portion. In this embodiment, body portion 16C carries with it at the end opposed to cutting head 18C an integral cylindrical shaft 62C which terminates in a pointed conical end. Handle member 14C is modified in that it carries and defines a cylindrical annular opening 94 having a tapered bottom, cylindrical annular opening 94 which is sized and designed to snugly, but rotatably seat around cylindrical shaft 62C without any means to mechanically secure it to shaft 62C. The pointed end of shaft 62C rides against the tapered bottom of opening 94 to allow a smooth and effortless pivoting movement between handle 14C and shaft 62C. As with cutting apparatus 12, 12A and 12B handle member 14C of glass cutting apparatus 12C allows a user to grasp the apparatus with his or her thumb and forefingers on flats 30C while resting handle member 14C in the crotch between the thumb and forefingers, and push cutting wheel 20 against a piece of to-be-cut glass without requiring any substantial or uncomfortable twisting of the hand or wrist. As with the system shown in FIGS. 1-4, the modifications which are detailed in FIGS. 5-7 all have handles 14A, 14B, and 14C, respectively, which are of substantially uniform width and which are substantially rectangular in cross section, with the portion which is to rest in the crotch of the hand between the thumb and forefinger being substantially flat to provide a comfortable fit with that portion of the user's hand.

It is thus seen that the various forms and modifications of the present invention provide a cutting apparatus which can be used in scoring glass by pulling it or pushing it by hand across a piece of to-be-cut glass. The unique handle member which is sized and shaped to fit comfortably in the hand of a user in the crotch between the thumb and forefinger, and also the flattened or grooved sides of the body portion allow ease and comfort of use without substantial effort or strain, and without requiring that the user's hand be twisted or turned into an uncomfortable position. In the embodiments shown the total, 360° pivoting action of the handle with respect to the body allows the user to maintain a natural posture and straight movement of the shoulder, arm, wrist and hand and fingers with precision and accuracy, but without strain, when using the tool of the present invention to score glass.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the spirit and scope of the invention as claimed, except as precluded by the prior art.

The invention in which exclusive right is claimed is:

1. A hand held glass cutting apparatus for use in scoring glass including:
    an elongated body portion having an external surface, a front end, a back end, a length dimension, and an axial center line, said front end designed to receive and secure a glass scoring element; and
    a handle member secured to said back end of said body portion, said handle member including a portion extending at an angle to said axial center line of said body portion, as projected beyond said back end, said extended portion of said handle member being designed and shaped to fit in the hand of a user in the crotch formed between the thumb and forefinger, with the portion which is to rest in the crotch of the hand between the thumb and forefinger being substantially flat to provide a comfortable fit with that portion of a user's hand.

2. The glass cutting apparatus of claim 1 in which said extended portion of said handle member includes a first wing and a second wing, said first and second wings being located and oriented in substantial radial opposition to one another on opposite sides of said axial center line of said body portion, projected beyond said back end, said first and second wings together defining a saddle which is shaped to fit comfortably in the hand of a user in the crotch formed between the thumb and forefinger.

3. The glass cutting apparatus of claim 1 in which said external surface of said body portion adjacent said front end includes a pair of substantially opposed flattened surfaces, and in which the body portion has a length dimension such that when a user's thumb and forefinger grasp said flattened external body portion surfaces said extended portion of said handle can be positioned to rest against and make firm contact with the crotch formed between the same thumb and forefinger.

4. The glass cutting apparatus of claim 1 in which a substantially cylindrical shaft extends from the back end of said body portion, and in which the handle member defines a substantially cylindrical annular opening designed and shaped to receive said cylindrical shaft in a manner such that the said handle and said shaft make a pivotal connection with respect to one another.

5. The glass cutting apparatus of claim 4, in which said substantially cylindrical annular opening extends through said handle member; in which said substantially cylindrical shaft is hollow, internally threaded, and of a length to extend substantially through said handle member; and in which said handle member is secured to said hollow, internally threaded substantially cylindrical shaft by means of a threaded element which extends through said annular opening in said handle member and into threaded connection with the threads of said hollow, internally threaded, cylindrical shaft in a manner which allows pivotal rotation of said handle member with respect to said body portion.

6. The glass cutting apparatus of claim 4 in which said substantially cylindrical shaft terminates in a spherical ball, in which said substantially cylindrical annular opening in said handle member terminates in a spherical socket, and wherein said spherical ball and said spherical socket are so dimensioned that said shaft and said handle member are connected together by means of a press fit connection between said spherical ball and said spherical socket in a manner which allows pivotal rotation of said handle member with respect to said body portion.

7. The glass cutting apparatus of claim 4 in which said substantially cylindrical shaft includes a circumferential slot and in which said handle member includes an opening positioned and located to allow a connecting element to be inserted and intersect with said circumferential slot to connect said handle member to said shaft in a manner which allows pivotal rotation of said handle member with respect to said body portion.

8. The glass cutting apparatus of claim 4 wherein said handle member is connected to said cylindrical shaft in a manner which allows complete 360° pivotal rotation of said handle member with respect to said body portion.

9. The glass cutting apparatus of claim 1 in which a glass scoring element is secured to said front end of said body portion substantially as a projection of said axial center line of said body portion.

10. A hand held glass cutting apparatus of the type which includes an elongated body portion having an external surface, a front end, a back end, a length dimension, and an axial center line, and a glass scoring element secured to the front end of the body portion, for use in scoring glass by pushing it by hand across a piece of to-be-cut glass, wherein the improvement comprises:
 a handle member designed to be secured to the back end of a body portion, said handle member including a portion which, when said handle member is secured to the back end of a body portion, will extend at an angle to the axial center line of the body portion, as projected beyond its back end, said extended portion of said handle member being designed and shaped with a substantially flat portion which is to rest in the crotch of the hand between the thumb and forefinger being to provide a comfortable fit in the hand of a user in the crotch formed between the thumb and forefinger in a manner which allows the hand which holds the glass cutting apparatus to be held in a comfortable position without unnatural or stressful bending or twisting of the hand or wrist, while the glass cutting apparatus is pushed in front of the hand, and while still maintaining the cutting element substantially straight or perpendicular with respect to the to-be-cut glass.

11. The glass cutting apparatus of claim 10, wherein said handle member is designed to be pivotally connected to the back end of the body portion to thereby allow relative pivotal motion between said handle member and the body portion.

12. The glass cutting apparatus of claim 10 wherein said handle member includes a portion which, when connected to a body portion will extend at an angle in two substantially opposed directions from the axial center line of the body portion as projected beyond its back end.

13. The glass cutting apparatus of claim 12 in which, when said handle member is connected to the back end of a body portion, said extended portion of said handle member includes a first wing and a second wing, said first and second wings being located and oriented in substantial radial opposition to one another on opposite sides of the axial center line of the body portion, as projected beyond its back end, said first and second wings together defining a saddle portion, whereby said saddle portion of said handle member is designed and shaped to fit in the hand of a user in the crotch formed between the thumb and forefinger to facilitate the pushing of the cutting apparatus across a piece of to-be-cut glass.

14. The glass cutting apparatus of claim 12 in which the handle member includes a portion in the form of a bow, which said bow is designed and shaped to fit in the hand of a user in the crotch formed between the thumb and forefinger to facilitate the pushing of the glass cutting apparatus across a piece of to-be-cut glass.

15. The glass cutting apparatus of claim 10 wherein a body portion is secured to said handle member.

16. The glass cutting apparatus of claim 15 wherein said body portion includes surface portions which are designed and dimensioned to be held by a user between the tip of the thumb and the tip of the forefinger when said extended portion of said handle member is located in the crotch of a user's hand between the thumb and forefinger of the same hand.

17. The glass cutting apparatus of claim 15 wherein said handle member is capable of pivoting a full 360° with respect to the axial center line of said body portion.

18. The glass cutting apparatus of claim 15 wherein means for pivotally connecting said handle member to said body portion are associated with said back end of said body portion.

19. The glass cutting apparatus of claim 18 wherein said handle member includes means for interacting with and connecting to said pivotal means associated with the back end of said body portion.

20. The glass cutting apparatus of claim 19 wherein said pivotal means associated with the back end of said body portion includes a cylindrical shaft, and wherein further said means of said handle member for associating with said pivotal means includes and defines an annular cylindrical opening dimensioned and designed to receive said cylindrical shaft.

21. The glass cutting apparatus of claim 19, wherein said connecting means includes a mechanical connector which is separate from said handle member and said body portion.

22. The method of scoring glass using a hand held glass cutting apparatus including an elongated body portion having a front end and a back end; a glass scoring element secured to said front end of said body portion as an extension of said body portion; and a handle member pivotally connected to said back end of said body portion, said handle member shaped with a substantially flat portion which is to rest in the crotch of the hand between the thumb and forefinger being to provide a comfortable fit in the hand of a user in the crotch formed between the user's thumb and forefinger to facilitate the pushing of the glass cutting apparatus across a piece of to-be-cut glass without unnatural or stressful rotation of the wrist and while maintaining the glass scoring element substantially straight or perpendicular with respect to the to-be-cut glass, including the steps of:

placing the front end of the body portion of the glass cutting apparatus between the tips of the thumb and the forefinger of a user;

placing the substantially flat portion of the handle member in the hand of a user in the crotch formed between the thumb and forefinger which is holding the front end of the body portion of the glass cutting apparatus;

placing the glass scoring element into contact with a piece of to-be-cut glass; and then pushing said glass cutting apparatus across the glass, with the glass scoring element in contact with and substantially perpendicular to the glass, while maintaining the hand which holds the glass cutting apparatus in a comfortable position without stressful bending or twisting of the hand or wrist.

* * * * *